Jan. 1, 1952 — C. A. HEILAND — 2,580,427
RECORDING SYSTEM
Filed Aug. 11, 1944 — 10 Sheets-Sheet 1
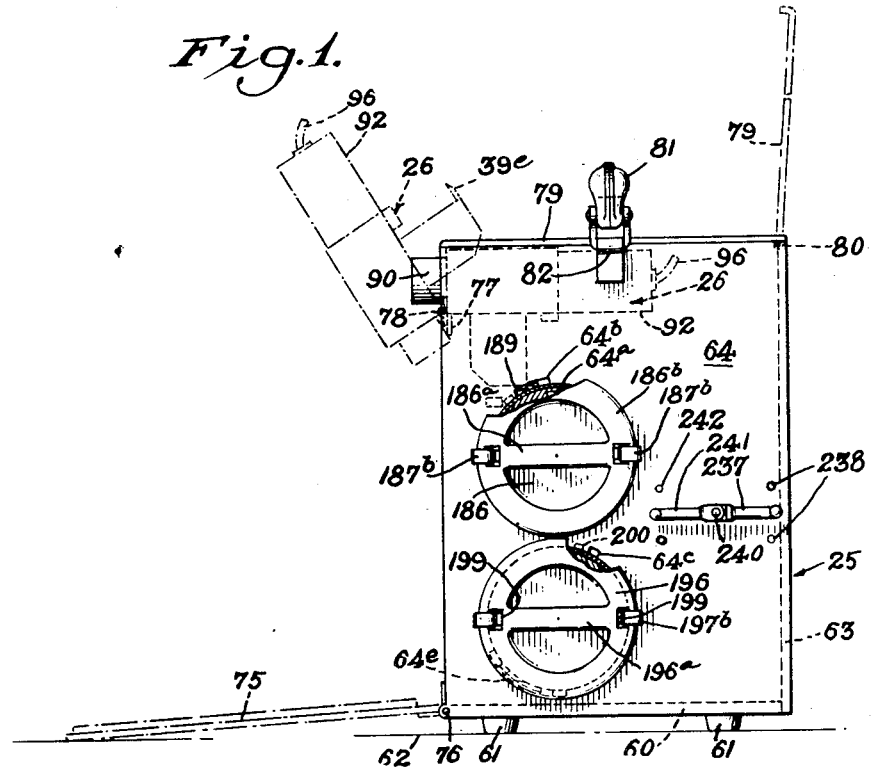
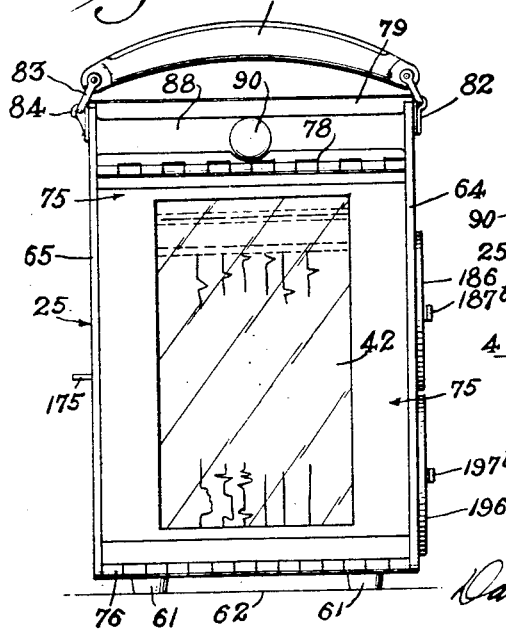
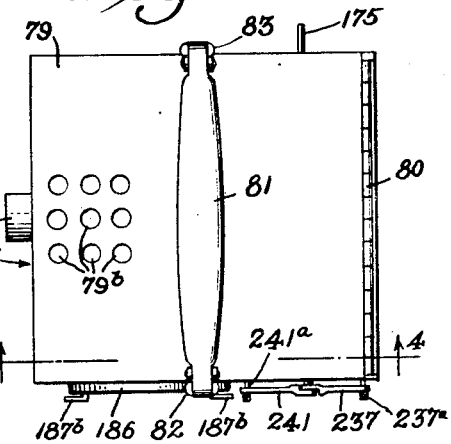
Inventor
Carl A. Heiland
BY
Davis, Lindsey, Smith & Shonts,
Attorneys.

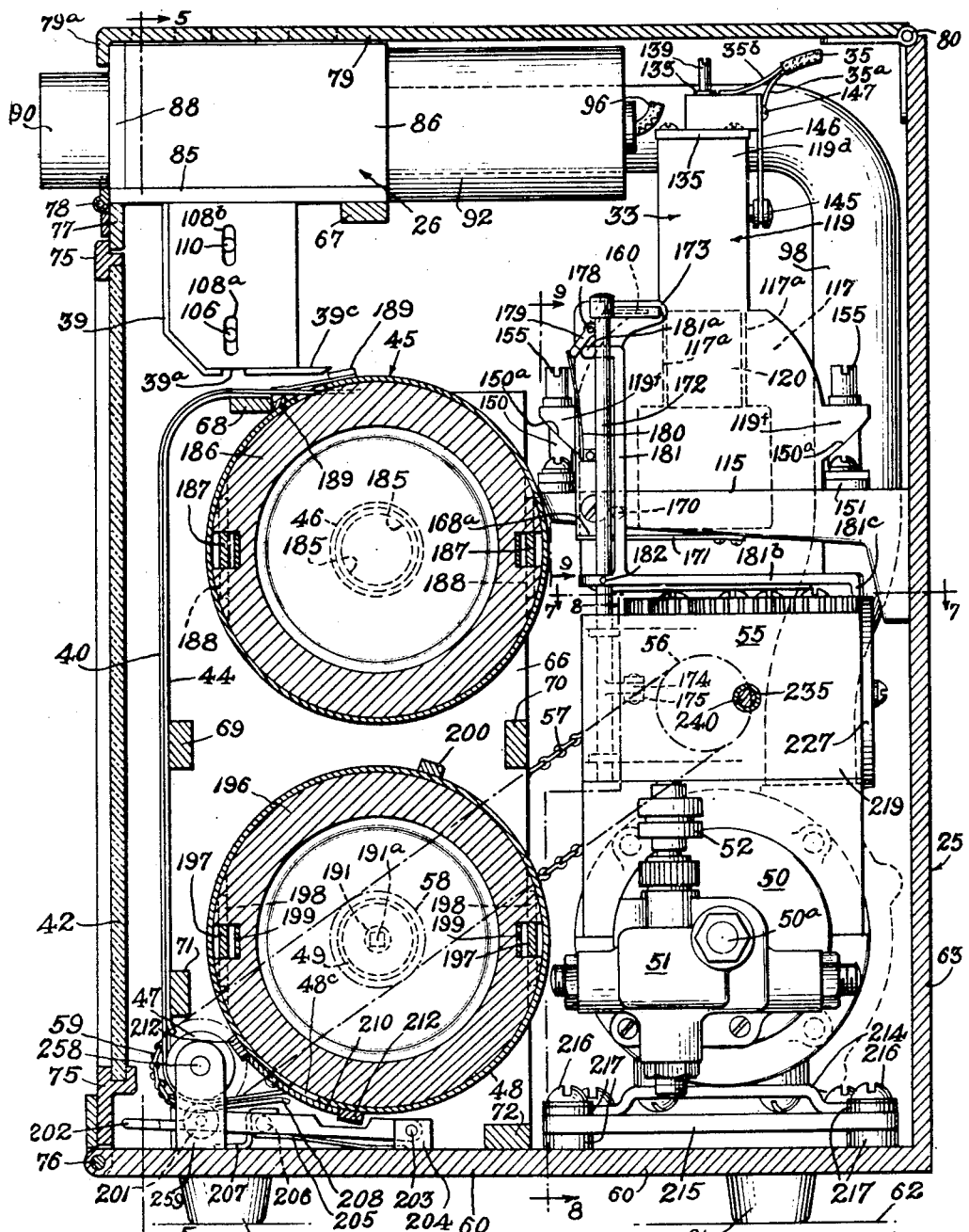

Jan. 1, 1952

C. A. HEILAND 2,580,427

RECORDING SYSTEM

Filed Aug. 11, 1944

Inventor
Carl A. Heiland
BY
Davis, Lindsey, Smith & Shonts,
Attorneys.

Inventor
Carl A. Heiland
BY
Davis, Lindsey, Smith & Shults
Attorneys.

Inventor
Carl A. Heiland

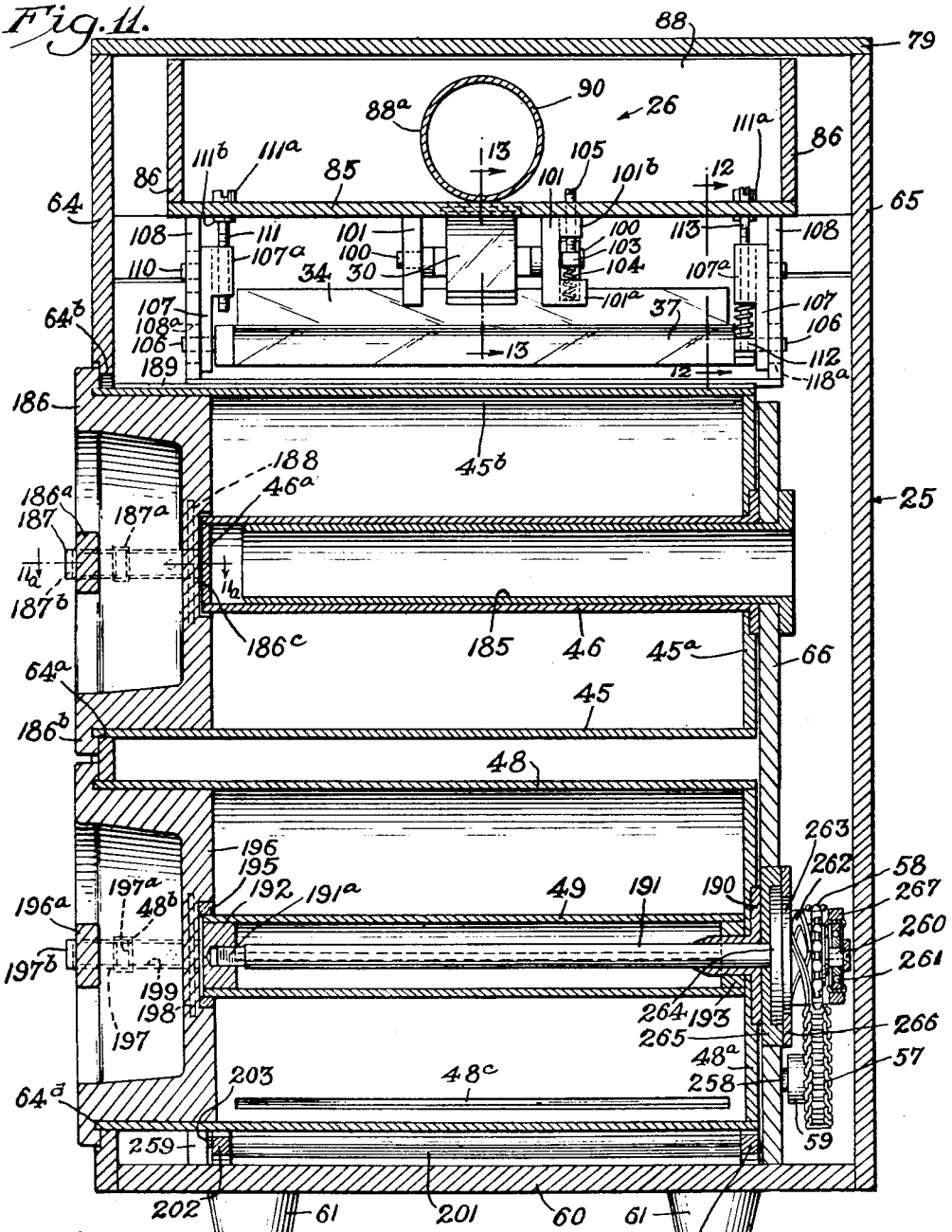

Jan. 1, 1952  C. A. HEILAND  2,580,427
RECORDING SYSTEM
Filed Aug. 11, 1944  10 Sheets-Sheet 8
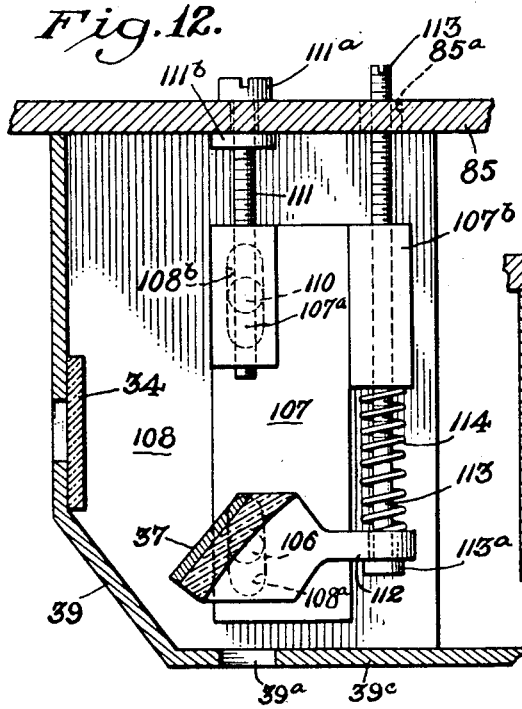
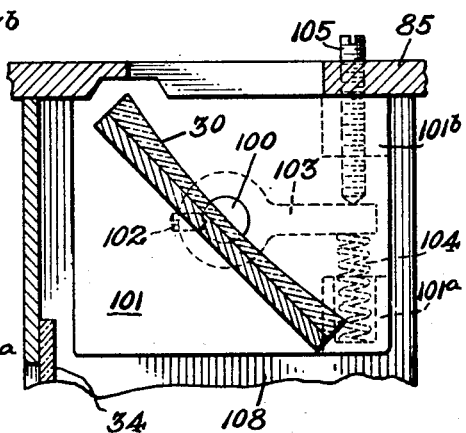
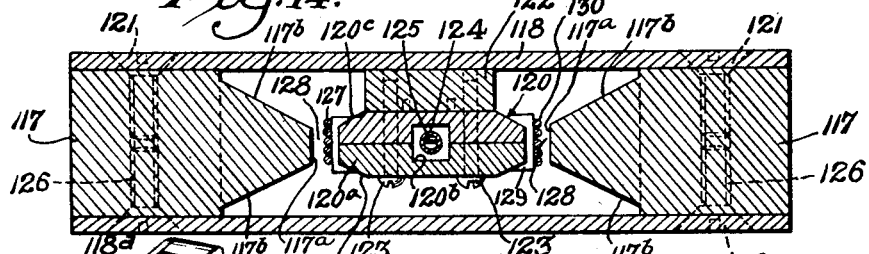
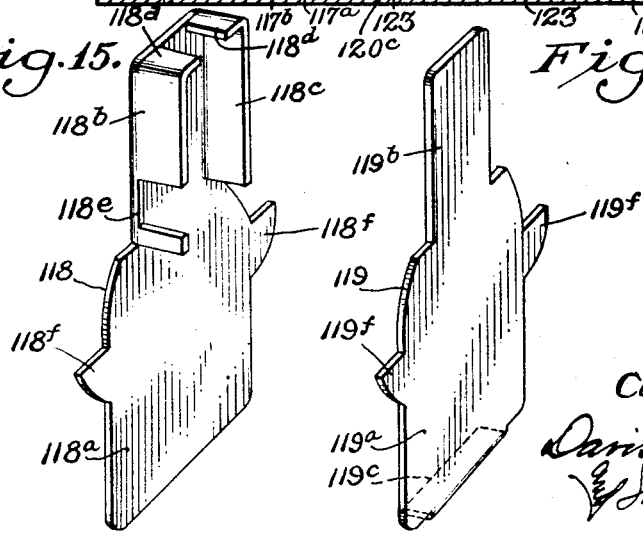
Inventor
Carl A. Heiland Jan. 1, 1952          C. A. HEILAND            2,580,427
                      RECORDING SYSTEM
Filed Aug. 11, 1944                        10 Sheets-Sheet 9
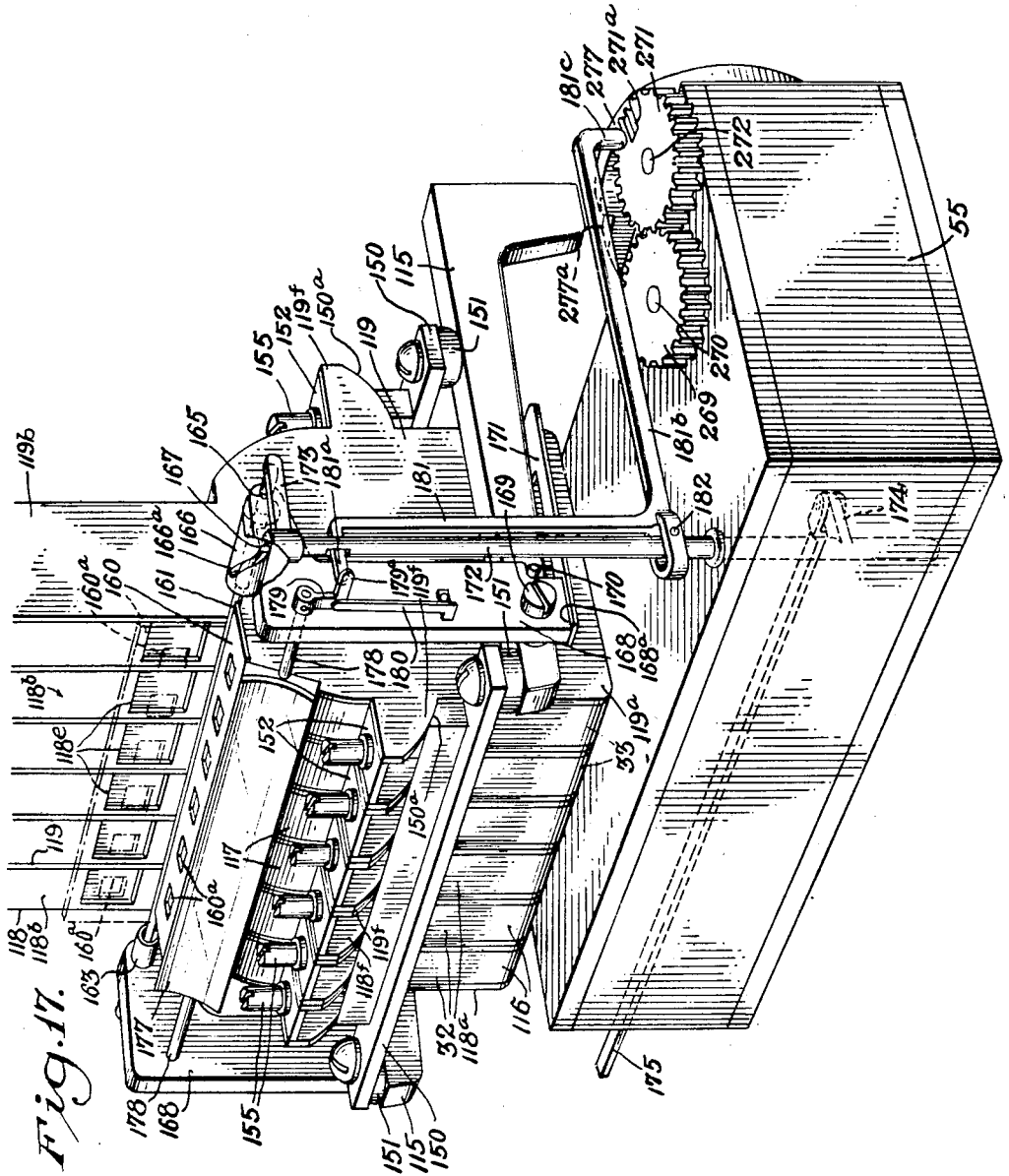
Inventor
Carl A. Heiland
BY
Davis, Lindsey, Smith & Shonts,
Attorneys.

Jan. 1, 1952   C. A. HEILAND   2,580,427
RECORDING SYSTEM
Filed Aug. 11, 1944   10 Sheets-Sheet 10

Inventor
Carl A. Heiland
BY
Davis, Lindsey, Smith & Shonts
Attorneys.

Patented Jan. 1, 1952

2,580,427

UNITED STATES PATENT OFFICE 2,580,427

RECORDING SYSTEM

Carl A. Heiland, Denver, Colo., assignor to Heiland Research Corporation, Denver, Colo., a corporation of Colorado Application August 11, 1944, Serial No. 549,104

17 Claims. (Cl. 346—108)

This invention relates to an improved method and apparatus in which electrical and photographic devices are employed for giving an immediately visible record of electrical or other phenomena which fluctuate with lapse of time, and the purpose of the invention is to provide an improved recording system which may be employed to indicate immediately and permanently fluctuations in values of any physical, chemical or electrical phenomena of either high or low frequency which may be indicated by the oscillations of an electric current.

An electrical measuring and recording system of the type to which the present invention relates may have a wide variety of uses in the fields of science and industry, such as the measurement of length of time, the determination of temperatures by electrical resistance thermocouples, the indication and measurement of light by the use of photoelectric cells, the measurement of sound which is converted into electrical impulses by a microphone, the measurement of magnetic forces through the agency of electric currents, the investigation of mechanical strains and vibrations through the use of electrical strain gauges and vibration detectors, the measurement of the acidity of chemical solutions, for recording the action of the heart and the brain in the field of medicine, and for various other uses in a field which has rapidly been broadened by the development of the science of electronics, in all of which an understanding of the phenomena under investigation may be enhanced by a study of the variations in the action of the subject under investigation with lapse of time.

Heretofore, various forms of apparatus have been employed for providing permanent records of time-variations of various phenomena being investigated, but most of these devices, commonly termed oscillographs or recorders, have not been adapted for many purposes because of limitations which have been inherent in their construction and organization. In one type of recorder, the record has been made by moving a pen or stylus which is responsive to the fluctuations in an electric current and which moves over the record sheet, making an imprint of its position continuously or at intervals either by passing a high tension electric spark at intervals through the pen point and through a chemically treated paper or by applying ink through the point of the pen or stylus. In another class of oscillographs employing galvanometers provided with mirrors, the movements of the mirrors which are responsive to fluctuations in an electric circuit are caused to direct beams of light onto a moving film contained in a camera, and a continuous record of the current fluctuations has thus been made, but such a record is only visible to the eye of the observer after the development of the film. Thus, while means have heretofore been provided for making permanent records of oscillations in an electric circuit which may be indicative of changes in various phenomena being studied, these devices have had the disadvantage that, where a pen point or stylus is employed, the apparatus is adapted for use only in the study of low frequency phenomena, since the pen or stylus, because of its inertia, cannot be made responsive to quickly changing fluctuations, while, in the other class of recording devices heretofore known, where a photographic film has been used, the recording method has had the disadvantage that the record made by photographic means is not immediately visible but requires the development of the film before the character of the oscillations can be known.

The principal object of the present invention is to overcome the defects of both types of recording instruments heretofore used by providing a recording electrical instrument in which the pen arm or stylus is a beam of invisible radiation, having no inertia, and capable of producing upon a traveling sheet a permanent and immediately visible record of the phenomena being studied. In carrying out this method of measurement and recording, a beam of invisible radiation proceeding from a suitable source is caused to be reflected by a mirror which moves with the armature of a galvanometer in response to fluctuations in an electric circuit which are indicative of changes in the phenomena under investigation, and this invisible ray is directed from the mirror of the galvanometer to the surface of a traveling film which is so sensitized that it is responsive to the invisible rays proceeding from the galvanometer mirror but not responsive to light rays which enable the film to be viewed by an observer through a filtering medium, whereby a permanent record is made on the traveling film and this record is made immediately visible to the observer.

In order to obtain these results, the invention comprises means for obtaining a correlated spectral discrimination for the invisible radiations which are employed to produce the record, for the sensitized paper or film on which the record is made and for the radiations or light rays under which the record is viewed by the observer. To produce the record, a radiation is employed which results in a trace being made with the minimum expenditure of energy which corresponds in wave length to the spectral sensitivity of the film or paper; it is necessary that this radiation be not one which is contained in the radiation or light which is employed for permitting the inspection of the record. To have the proper spectral response, the film or paper must react readily to the radiation which is employed for producing the record and must not react to the radiation or light which is used for the observation of the record and which must comprise a spectral band not containing the record producing wave lengths nor wave lengths to which the paper or film is sensitive. Accordingly, by providing invisible radiations, sensitized films and rays of light for inspection purposes which are mutually discriminatory in their effect, it is possible to make a record of high frequency phenomena which is immediately visible without the film being affected in any way by the light under which the record is viewed.

In order to obtain this discrimination in the use of the different agencies involved, it has been found desirable to use a record producing or primary radiation which is wholly or primarily of an invisible nature, such as ultra-violet radiations or infra-red radiations, either separately or simultaneously, although it is now the preferred practice to use either form of radiation separately. Radiators and filters having the desired characteristics for producing either ultra-violet or infra-red radiations and for permitting the inspection of the record on the film while screening out the invisible radiations are well known and may be adapted to the purpose of the present invention with slight modifications. For producing ultra-violet radiations, a mercury vapor tube may be used, while, to produce the infra-red radiations, a tube with a carbon or metal filament may be employed. The color-temperature of such radiations is lower than that generally used to produce visible light and the omission band of both the ultra-violet and the infra-red radiations may be narrowed, if desired, by the use of appropriate filters.

The emulsions for coating the paper or film upon which an immediately visible record is to made are not available in the market and must be specially prepared according to the present invention. Their preparation requires sensitization to produce an immediately visible record and to produce a maximum response to the invisible rays. Methods are now known for effecting the proper spectral sensitization of the film to produce response to the invisible rays. For example, sensitization for the infra-red rays has been satisfactorily carried out by treating the emulsion with cyanine dyes such as neo-cyanine and xeno-cyanine dyes, or with poly-carbocyanine dyes, including tetra-carbocyanine and penta-carbocyanine. The sensitization of the film for response to the ultra-violet rays may be effected in any one of several ways which are now well known.

Thus, so far as the preparation of the emulsion is concerned, the primary problem has been to provide an emulsion which will react immediately to the ultra-violet or infra-red radiations to produce a permanent record which is immediately visible. It has been found that emulsions of high sensitivity having this characteristic of immediate visible reaction to the invisible rays may be prepared by a two-step process consisting in preparing first a bromide emulsion in the customary manner by causing a reaction between silver nitrate and potassium bromide in the presence of colloidal gelatin and then coating the paper or film with this liquid, and then treating the emulsion on the film or paper with a solution of silver nitrate of low concentration or with two solutions, the first consisting of potassium nitrate of low concentration, and the second consisting of silver nitrate of low concentration which is applied after the emulsion has dried.

Depending upon the speed of travel of the film, the paper or film thus treated will be available for inspection in daylight under the filters which are used for inspection purposes and will continue to be visible. The speed of travel may be several inches per minute or several inches per hour, depending upon the character of the phenomena under investigation. After the record has been made in the recording apparatus, it may be coiled up in a roll and preserved for future use and may be later inspected under subdued artificial light, or the record roll may be fixed in the customary manner by a solution of sodium thiosulphate after which it may be exposed to bright daylight without danger of discoloration.

These and other objects and characteristics of the invention will appear more fully hereinafter and the nature of the invention will be understood from the following specification taken with the accompanying drawings in which one embodiment of the apparatus for the present invention, which is capable of carrying out the improved recording method hereinabove referred to, is illustrated. In the drawings, Figure 1 shows an end elevation of the recording apparatus of the present invention with its principal parts enclosed in a cabinet or casing, portions thereof being broken away and parts of the cabinet being illustrated by dotted lines in their open positions;

Fig. 2 shows a front elevation of the recording apparatus illustrated in Fig. 1;

Fig. 3 shows a top plan view of the apparatus illustrated in Figs. 1 and 2 with the top cover in its closed position;

Fig. 4 shows a vertical sectional view taken on the line 4—4 of Fig. 3;

Fig. 11 shows a vertical section taken on the line 11—11 of Fig. 6;

Fig. 11a is a sectional view taken on the line 11a—11a of Fig. 11;

Fig. 12 shows an enlarged vertical section through one end portion of the receiving mirror assembly illustrated in Fig. 6, showing the means for effecting the vertical and angular adjustment thereof;

Fig. 13 shows an enlarged vertical section through an end portion of the projection mirror illustrated in the upper left-hand part of Fig. 6 and associated parts of the apparatus, illustrating the means for adjusting the normal angular position of this mirror;

Fig. 14 is an enlarged vertical section taken on the line 14—14 of Fig. 6, illustrating the construction of the magnet and armature of one of the galvanometers;

Fig. 15 is a perspective view of one of the side plates of one of the galvanometers;

Fig. 16 is a perspective view of the other side plate of one of the galvanometers;

Figure 18:
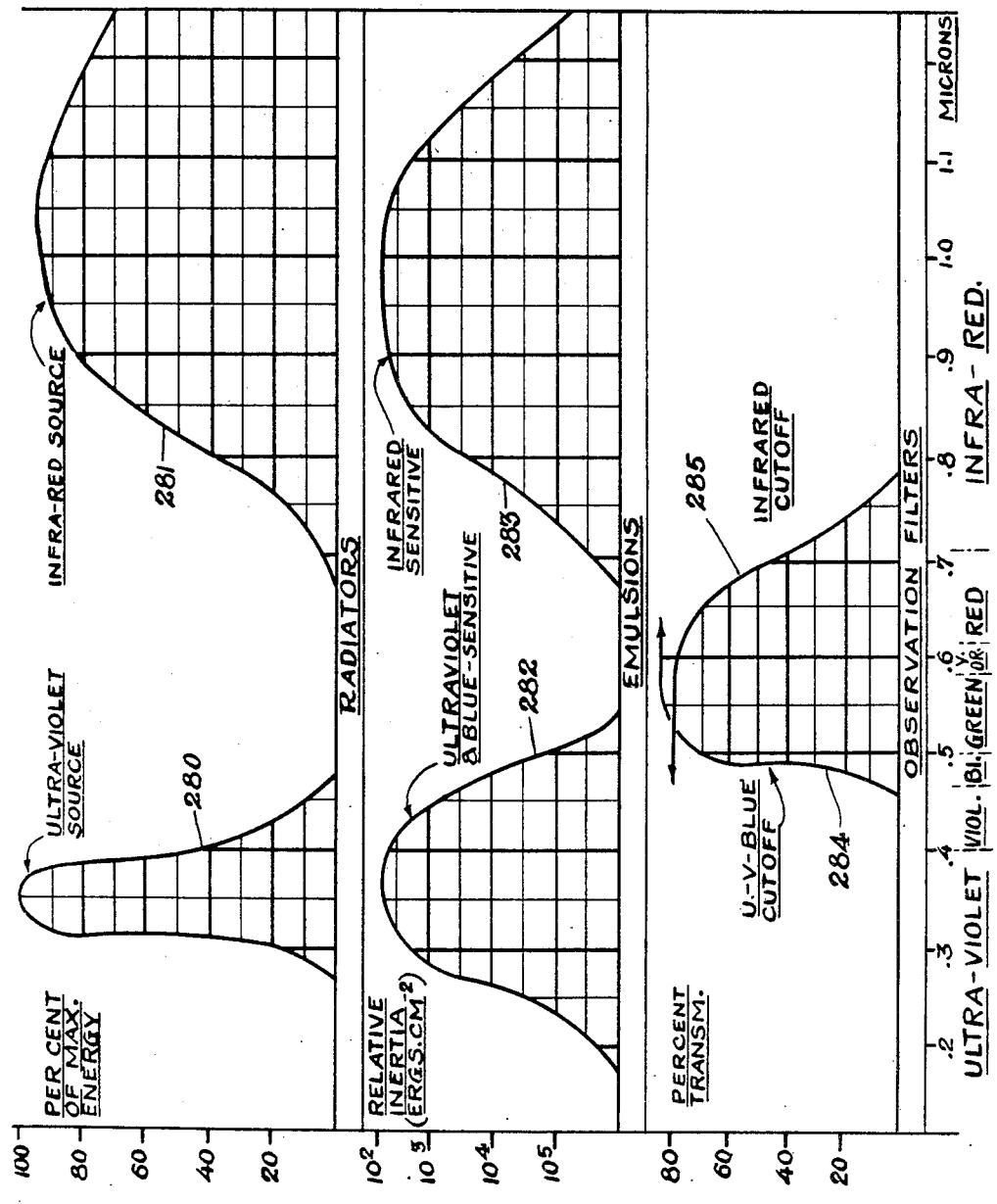

Fig. 17 is a perspective view of the principal parts of the group of galvanometers which are embodied in the recording apparatus, illustrating the means for operating the shutter by which the light admitted to the galvanometer mirrors is regulated, and showing, also, the means for operating a mirror by which time lines are recorded periodically on the moving sheet or film; and Fig. 18 is a chart showing the actions of different sources of invisible radiations, sensitizing emulsions and observation filters as functions of wave lengths.

Before proceeding to a detailed description of the recording apparatus illustrated in the drawings, reference will be made to the more important parts of the construction and to the general mode of operation of the apparatus in order to facilitate an understanding of the details subsequently described.

Figure 6:
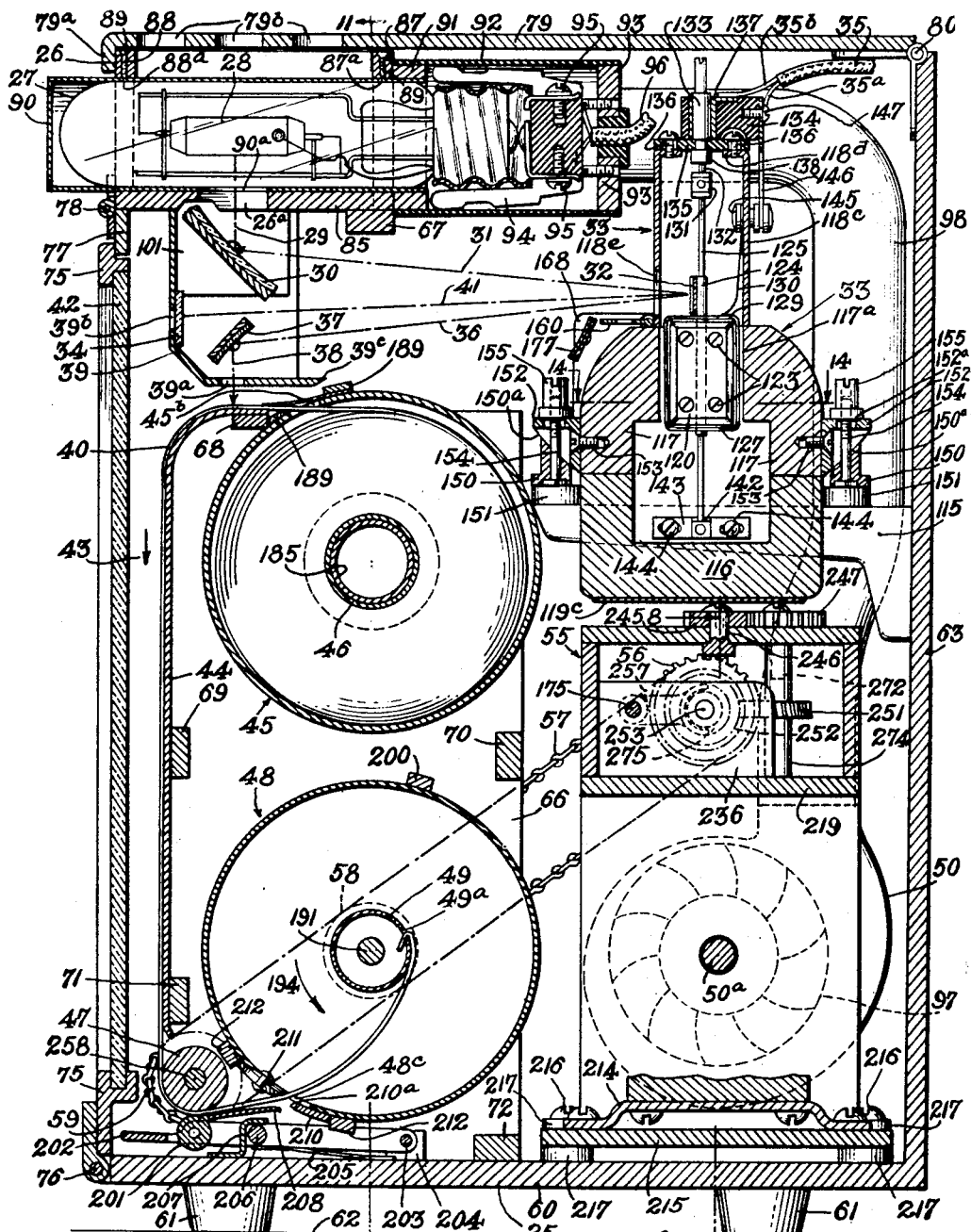
Fig. 6 shows a vertical section taken on the line 6—6 of Fig. 5.

Referring particularly to Fig. 6, it will be seen that the apparatus comprises a portable case or housing 25 having mounted in the upper part thereof an auxiliary casing 26 containing the source of invisible radiations which, in this instance, is illustrated as a bulb 27 adapted to be connected in an electric circuit and embodying a tube 28 adapted to emit the invisible radiations which may be ultra-violet rays or infra-red rays, or combinations of these, depending upon the character of the bulb which is used. These rays pass downwardly through a slot 26ª in the bottom of the auxiliary casing 26 along a line 29 and impinge upon the concave surface of a cylindrical projection mirror 30, which is so described because it is constructed as an arcuate segment of a complete cylinder. This mirror is adjustable angularly and the invisible rays pass from its surface along a line 31 to concave surfaces of cylindrical galvanometer mirrors 32 which are mounted to oscillate with the movable elements of a series of galvanometers 33. These galvanometers are arranged side by side and each one is connected by a cable 35 with a source of electrical oscillations to be studied with the use of the recording apparatus. The mirrors 32 of these galvanometers oscillate about vertical axes in response to the oscillations in the respective circuits to which they are connected and the beam of invisible radiation 36 which passes from each galvanometer mirror 32 is thus caused to oscillate as it passes to a receiving mirror 37 which is constructed as a segment of a cylinder and which is so mounted that its concave surface reflects the invisible beam received along the line 36 downwardly along the line 38, through an opening 39ª in a shield or apron 39, to the sensitized film or paper 40 upon which the permanent record is made. A part of the invisible rays reflected from the galvanometer mirrors 32 passes between the mirrors 30 and 37, along the line 41 and impinges upon the surface of a frosted glass fluorescent screen 34, resulting in a brightly illuminated line on that screen which indicates the fluctuations of the galvanometer mirror to the observer through a slot 39ᵇ formed in the apron 39 and positioned opposite the filter screen 42 forming a substantial part of the front wall of the case or housing 25.

This filter 42, which is constructed to exclude the invisible radiations from the daylight, serves as the means for permitting the operator to view the permanent record which is formed on the sensitized film or paper 40 by the oscillating beam 38 directed thereto from the receiving mirror 37. The sensitization of the film or paper being such that a permanent record is immediately made, this record may be viewed as the film 40 passes downwardly in the direction of the arrow 43 in front of a guiding plate 44. The records of the oscillations or fluctuations of the several circuits connected to the galvanometers 33 are indicated by the zigzag or irregular lines on the film or paper 40 in Figs. 2 and 4. The film or paper is continuously supplied from a magazine 45 containing a drum or reel 46 upon which the sensitized paper is wound and, after passing over the guide plate 44 and a feeding roller 47, the film or paper passes to a receiving magazine 48 containing a drum or reel 49 on which the exposed film or paper is continuously wound during the operation of the apparatus.

The film or paper 40 is unwound from the drum 46 and wound upon the drum 49 by the operation of a driving connection extending from an electric motor 50 which is connected through change speed mechanism 51 and a coupling 52, shown in Fig. 4, with gearing mechanism 55 which is capable of adjustment to change the speed of movement of the film and which drives a sprocket gear 56 connected by a sprocket chain 57 with another sprocket gear 58 adapted to drive the drum 49 and a sprocket gear 59 which is fixed on the shaft of the feed roller 47. In this way, the mechanism of the recording camera may be continuously operated during the connection of the cables with the sources of oscillations being studied, and the beams of invisible radiations reflected by the several galvanometer mirrors 32 will be directed by the mirror 37 to the sensitized film or paper which will make an immediate record of the oscillations of the movable element of each galvanometer, these records extending parallel to each other on the paper sheet and being visible to the observer as they pass downwardly over the guide plate 44.

With this preliminary explanation of the general features of operation of the apparatus, reference will now be made to the more detailed construction of its various parts. As shown particularly in Figs. 1, 2, 3, 4, 5 and 6, the portable case or housing 25 comprises a base plate 60 provided on its under side with legs or cushions 61 of rubber or the like which are adapted to rest upon the surface of a table or other support 62. Extending upwardly from the bottom plate 60 is a back plate 63 which is united at its edges with the side plates 64 and 65, the latter of which is removable in order to permit access to certain parts of the apparatus within the casing when desired. Spaced inwardly from the side plate 65 is an intermediate supporting plate 66 which is rigidly connected to the fixed side plate 64 by a number of cross frame members 67, 68, 69, 70, 71 and 72, these parts forming a rigid frame structure which carries the principal parts of the apparatus, as hereinafter more fully described.

The front wall of the casing 25 is made up of a hinged wall or door 75 which carries the filter 42 previously referred to. This door is hinged at 76 on the forward edge of the base plate 60 and normally occupies an upright position which locates the filter 42 in front of and parallel to the guide plate 44 over which the film passes. The top edge of the door 75 is arranged to overlap a transverse frame member 77 which extends between the side plate members 64 and 65 and which serves as a support for a hinge 78 which provides a hinged mounting for the front edge of the auxiliary casing 26 containing the source of invisible radiations. When this auxiliary casing is in its normal position shown in Fig. 6, its upper side is closed by the top cover 79 of the casing which is hinged at 80 on the back plate 63 and which is provided at its forward edge with a lip 79a overlapping the upper edge of the forward wall of the casing 26. The portable casing 25 is adapted to be transported through the agency of a handle 81 which is connected at one end to a bracket 82 fixed to the top part of the side plate 64 and which carries at its other end a ring 83 adapted to form a detachable engagement with a snap hook 84 secured to the top edge of the side plate 65. When the handle 81 is disengaged from the hook 84, the top cover 79 may be swung upwardly to permit access to the contents of the casing and in particular to the contents of the auxiliary casing 26. When the cover 79 has thus been raised, the auxiliary casing 26, containing the source of invisible radiations, may be swung upwardly about its hinge 78 to permit more ready access to the bulb 27 and its connections and to the parts of the apparatus which are positioned below the normal position of the casing 26.

Figure 5:
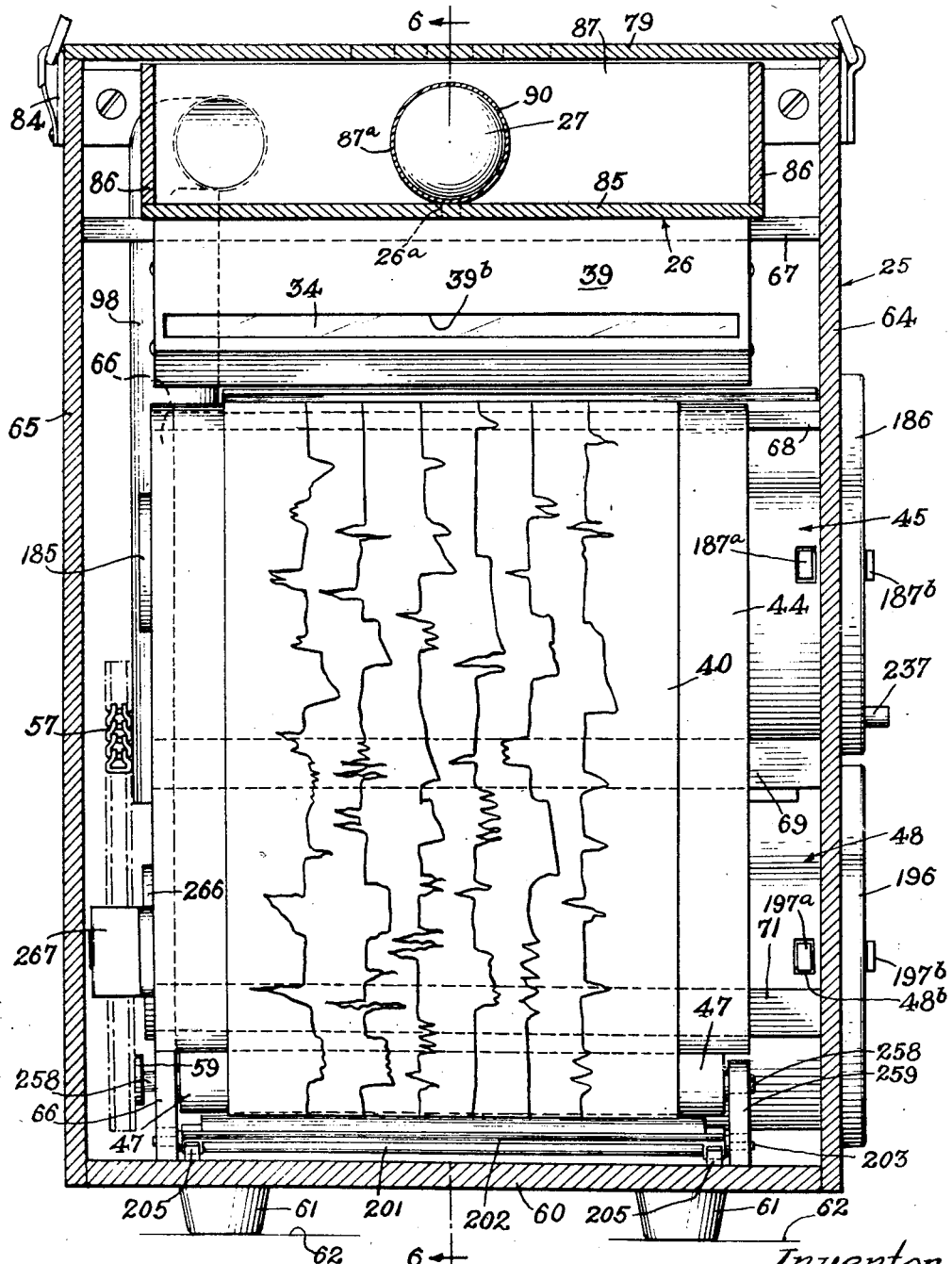
Fig. 5 shows a vertical sectional view taken on the line 5—5 of Fig. 4.

The auxiliary casing 26 comprises a bottom plate 85 which contains the slot 26a previously referred to for permitting the passage of radiations downwardly from the bulb 27 to the mirror 30 and this bottom wall extends throughout a substantial part of the width of the casing, as shown in Fig. 5. Side walls 86 extend upwardly from the sides of the bottom wall 85 and these side walls are connected at their rear edges by the back wall 87 of the auxiliary casing. At their forward edges, the bottom wall 85 and the side walls 86 are connected by the front wall 88 which has formed therein an aperture 88a through which the front end of the bulb 27 projects. The bulb 27 is enclosed by a tubular envelope or shell 90 which is closed at its forward end and which extends rearwardly with the bulb through the aperture 88a and also through an aperture 87a formed in the rear wall 87 of the auxiliary casing. This shell is provided on its under side with a slot 90a registering with the slot 26a in the bottom wall 85 in order to permit the invisible radiations to pass downwardly from the tube 28 to the mirror 30 and is adjustably secured in position by set screws 89 engaging the members 87 and 88 so that it may be rotated to cause these slots to register. The rear wall 87 has attached thereto a supporting ring 91 on which there is fixed, by brazing or the like, the forward end of a sleeve 92 closed at its rear end by a disk 93. The shell 90 extends through the member 91 and when the set screws 89 are released the shell 90 and the bulb 27 may be removed. The sleeve 92 houses the socket 94 which is threadedly engaged by the stem portion of the bulb 27 and the terminals of this socket are connected to conductors 95 which lead through a cable 96 to a source of electrical energy through which the bulb 27 is energized during the operation of the apparatus. The cable 96 may lead through a notch in the upper edge of one of the side walls of the casing 25 so that, when the top cover 79 is swung upwardly, the auxiliary casing 26 and its connections may be swung upwardly and forwardly about the hinge 78. When the auxiliary casing is in its normal horizontal position, as shown in Figs. 4 and 6, it is supported by the transverse frame member 77 and by the transverse frame member 67.

For cooling purposes, a fan 97, driven by the motor 50, is arranged to discharge air through a conduit 98 which leads into the auxiliary casing 26 through an aperture in the rear wall 87 positioned at one side of the sleeve 92 and the air which is thus introduced into the auxiliary casing for the purpose of cooling the bulb 27 is discharged into the atmosphere through openings 79b which are formed in the top cover 79 immediately above the open upper side of the casing 26.

As illustrated in Figs. 6, 11 and 13, the projecting mirror 30 comprises a mirror proper mounted upon a backing plate and this composite plate is provided at its ends with relatively fixed trunnions 100 which are journaled in bearings formed in bearing plates 101 attached to the under side of the bottom wall 85 of the auxiliary casing 26. One of the trunnions has adjustably mounted thereon by means of a set screw 102 a laterally projecting arm 103 which extends between two lugs 101a and 101b formed on the adjacent bearing plate 101. The lug 101a is socketed to receive a coil spring 104 which engages the under side of the arm 103 and the upper side of this arm is engaged by an adjusting screw 105 having a threaded engagement with the lug 101b and with the bottom wall 85 of the auxiliary casing. This adjusting screw 105 is accessible through the auxiliary casing when the top cover 79 has been elevated for the purpose of adjusting the angular position of the arm 103 and the corresponding angular position of the mirror 30, which adjustment may be required in order to cause the beam 31 of invisible radiations to impinge at the proper points upon the cylindrical mirrors 32 of the galvanometers 33. By the use of the set screw 102 for regulating the normal position of the arm 103 on its trunnion 100, a wide range of adjustability may thus be obtained.

The receiving mirror 37 is also adjustably mounted, as shown particularly in Figs. 4, 6, 11 and 12, and it is also capable of adjustment vertically in order to vary its spaced relation to the film or paper 40. For this purpose, the mirror 37 and its backing plate are provided with longitudinally extending trunnions 106 which are journaled in bearing plates 107 and which slidably engage elongated slots 108a formed in supporting plates 108 mounted on the bottom wall 85 of the auxiliary casing and constituting the end walls of the apron or shield 39, previously referred to, which encloses the mirrors 30 and 37 except on the inner sides thereof which are directed toward the galvanometer mirrors 32. These end plates 108 are shaped to conform to the configuration of the apron 39 and the bottom wall 39c of the apron, which has the slot 39a formed therein, is extended rearwardly beyond the end plates 108, as shown in Figs. 6 and 12, in order to protect the sensitized film or paper 40 from all light rays or other rays except the invisible radiations which pass thereto through the slot 39a. The end plates 108 are also provided with elongated slots 108b, located in vertical alignment with the slots 108a and arranged to be engaged by pins 110 which extend from the upper portions of the plates 107. The upper parts of the plates 107 are provided with lugs 107ª which are threadedly engaged by adjusting screws 111 which extend upwardly through the bottom plate 85 of the auxiliary casing, being provided above this wall with heads 111ª adapted to be engaged by a screw driver for regulating the elevation of the plates 107 with respect to the supporting plates 108, thereby varying the spaced relation of the mirror 37 and the portion of the film or paper 40 which is located beneath the slot 39ª. Collars 111ᵇ hold the screws 111 against endwise movement with respect to the plate 85.

One end of the mirror 37 is provided with a rearwardly extending arm 112 which is provided with an aperture loosely engaged by the lower unthreaded portion of an adjusting screw 113 which extends upwardly and threadedly engages an aperture in a lug 107ᵇ carried by the adjacent plate 107. The upper threaded end of this adjusting screw extends through an aperture 85ª in the bottom wall 85 of the auxiliary casing and the notched end of this screw may be engaged by a screw driver for regulating its position in the lug 107ᵇ. A coil spring 114 is mounted around the lower end of the adjusting screw between the lug 107ᵇ and the end of the arm 112 and normally serves to maintain the arm 112 against the head 113ª of the screw so that, when the screw is adjusted in the lug 107ᵇ, the angular position of the mirror 37 is varied in order to cause the beam 38 of invisible radiations to pass properly through the aperture 39ª in the shield 39.

Figure 9:
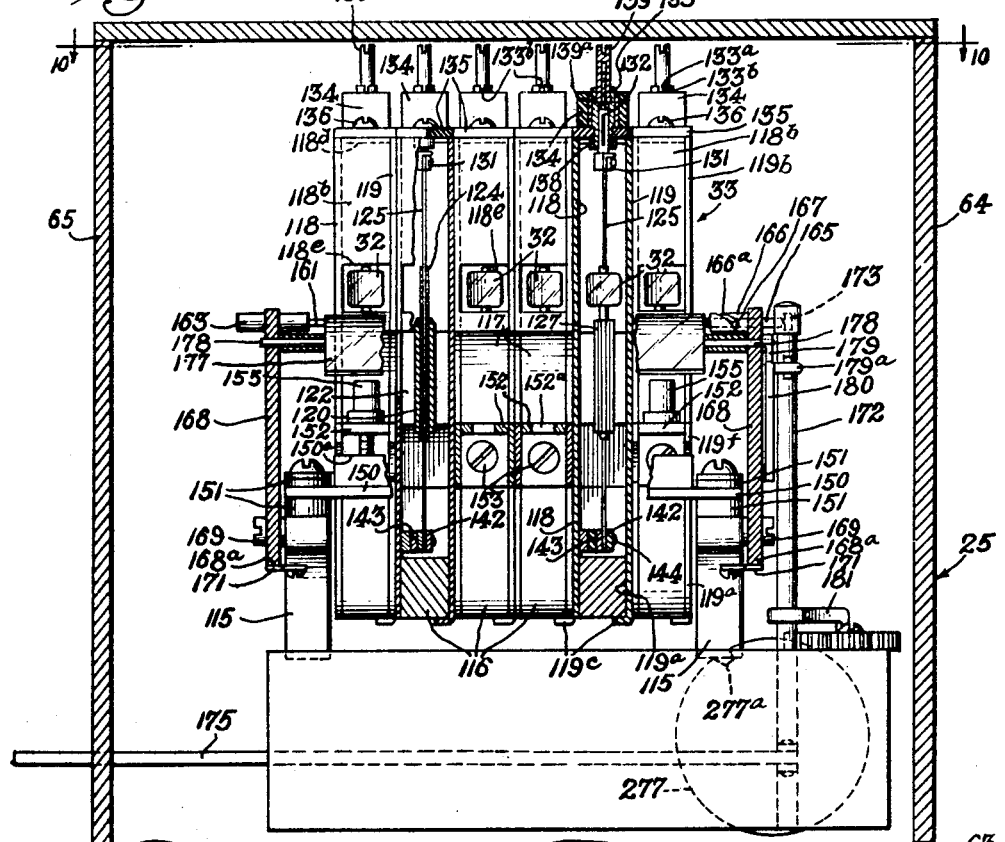
Fig. 9 shows a vertical sectional view taken on the line 9—9 of Fig. 4.
Figure 10:
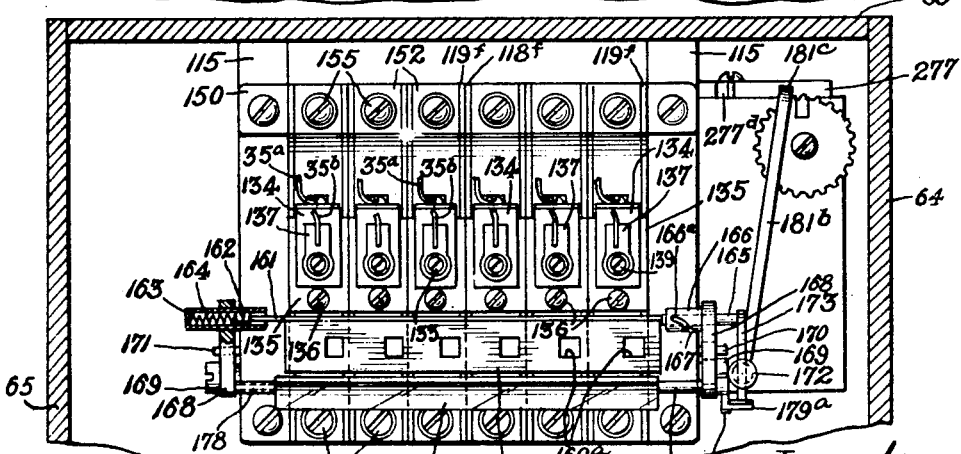
Fig. 10 shows a horizontal sectional view taken on the line 10—10 of Fig. 9.

As shown in Figs. 9, 10 and 17, the galvanometers 33 which include the recording mirrors 32 are arranged in a group in parallel relationship at the rear of the cabinet 25 where they are supported by a pair of parallel brackets 115 secured to the back plate 63 and extending horizontally therefrom. These galvanometers are capable of use apart from the present invention and are claimed in a copending application Serial No. 549,105, filed August 11, 1944, now Patent No. 2,535,065, issued December 26, 1950. In the embodiment illustrated, there are six identical galvanometers supported by and between these brackets, this being a convenient number for the simultaneous study and recording of a number of electrical phenomena. The galvanometers are so constructed that their dimensions are comparatively small measured transversely to the plane of incidence of the invisible rays, that is, the plane determined by the lines 31 and 36 for each galvanometer. The magnetic fields of adjacent galvanometers are parallel to each other and parallel to or coincident with the planes of incidence and the coils of the movable elements of the galvanometers also occupy these planes of incidence with the mirrors 32 mounted at right angles to those planes. To accomplish this arrangement, each galvanometer 33 includes a permanent magnet 116 having attached to its opposite arms two pole pieces 117 which, in effect, form continuations thereof. These pole pieces are provided with opposite pole faces 117ª, the dimensions of which are very limited, measured transversely to the plane of incidence, as shown in Fig. 14, this result being accomplished by tapering the magnetizable material of these pole pieces on opposite sides of each pole face, as indicated at 117ᵇ, the two surfaces 117ᵇ of each pole piece making an angle of about 60 degrees with each other. The magnet 116 and the pole pieces 117 of each galvanometer are mounted between a pair of side plates 118 and 119 which have the form shown particularly in Figs. 15 and 16, respectively, and a stationary field piece or armature core 120 is mounted between the pole faces 117ª. The method of assembly of these parts is shown particularly in Figs. 6, 14, 15 and 16. The magnet 116 and the pole pieces 117 are first placed against the lower part 118ª of the plate 118, which is shaped to conform to the contour of these members, and secured thereto by screws 121. The stationary field piece or armature core 120 is attached to the side plate 118 by means of a magnetically insulating spacing block 122 which is attached to the plate 118 and engaged by screws 123 which pass through the identical complementary parts 120ª of the field member 120. The complementary members 120ª are provided with vertically extending recesses which form a vertical channel 120ᵇ of rectangular cross section which is adapted to receive a tubular member 124, formed of aluminum or the like and mounted upon the suspended shaft or ribbon 125 formed of gold alloy or the like which carries the movable coil 127 of the galvanometer. The parts 120ª of the field piece 120 are tapered along their vertical edges 120ᶜ so that their vertical faces are of the same width as the pole faces 117ª from which they are spaced by air gaps 128. After the field piece 120 has been mounted on the block 122 to form the air gaps 128 of equal dimensions, and after the coil 127 has been assembled and placed in its proper position as hereinafter described, the magnet 116 is put in place against the bottom faces of the pole pieces 117 and the side plate 119 of the galvanometer is attached by screws 126 or the like to the field pieces 117, with the flange 119ᶜ of this plate extending below and supporting the magnet, thus forming a unitary structure.

In the assembly and mounting of the armature, cross bars 129 are secured to the upper and lower portions of the tube 124 to extend parallel to each other and form a frame for the armature coil 127 which is formed by winding relatively small insulated copper wire 130, such as gauge 46 copper wire insulated with Bakelite enamel, about the cross bars. After mounting the mirror 32 on the upper end of the tube 124, the ribbon 125 is threaded through the tube and the coil is placed over the back member 120ª of the field piece with the tube 124 engaging the rear recess 120ᵇ, this member 120ª being then held by pins on the block 122 which is brazed or otherwise secured to the side plate 118. Thereupon, the upper and lower ends of the ribbon are secured by their clamping devices, hereinafter described, and the tube 124 is adjusted vertically to the proper position on the ribbon and then secured to the ribbon. After adjusting the ribbon laterally, as hereinafter described, to position the coil properly in the air gaps and to position the tube in the recess 120ᵇ, the front member is put in place and the screws 123 inserted to hold the field piece in position. This method of construction locates the supports for the coil entirely outside of the air gaps 128 so that a maximum of space is allowed for the portions of the windings which extend through the gaps. The vertical stretches of the coil occupy positions midway of the gaps 128 and the coil 127 is thus free to oscillate about the axis of the ribbon 125, being influenced by the current, the torsion of the ribbon and the action of the magentic field.

The side plate 118 has an upwardly extending part of rectangular outline which is provided along its front edge with a transversely extending flange 118ᵇ and along its rear edge with a transversely extending flange 118ᶜ, which flanges terminate at their upper ends in inturned lips 118ᵈ having their outer surfaces lying flush with the upper end of the body of the plate, thus forming a support for the upper mounting of the ribbon as well as for the coil 127 and the mirror 32 which is mounted on the upper end of the tube 124. The forward flange 118ᵇ of the plate 118 is provided with a square opening 118ᵉ which provides a passage for the beam 31 passing to the mirror 32 and for the reflected beam 36 passing therefrom, as shown in Fig. 6. The lower part 119ᵃ of the side plate 119 is shaped to conform to the outline of the magnet 116 and the pole pieces 117 and its upper rectangular extension 119ᵇ of the other side plate is adapted to fit against the outer margins of the flanges 118ᵇ and 118ᶜ, thus completing the enclosure or housing in which the upper part of the ribbon 125 and the mirror 32 are mounted. The plate 119 is provided at its bottom with a transverse flange 119ᶜ which underlies and supports the magnet 116.

The mounting of the ribbon 125 is illustrated particularly in Figs. 6, 9 and 10, where the upper end of the ribbon is illustrated as being secured in a clamp 131 mounted on the lower end of a shank 132 which is keyed within a tubular metal torsion head 133. An insulating connector block 134 is seated upon an insulating plate 135, formed of Bakelite or the like, and this block 134 has a vertical aperture in which there is secured a metallic bushing 137 arranged to fit over the torsion head 133. The plate 135, to which the torsion head 133 is secured, is provided with elongated slots engaged by screws 136 which enter threaded holes in the lips 118ᵈ formed on the upper end of the side plate 118 so that, by loosening the screws, the plate 135 and the parts mounted thereon may be shifted with respect to the plates 118 and 119. The lower part of the torsion head 133 is threaded to pass through an aperture in the plate 135 and the lower end thereof is engaged by a nut 138, thus clamping the torsion head frictionally in position. The upper end of the shank 132 is threaded for engagement by an elongated nut 139 which is notched at its upper end for engagement by a screw driver or the like and which has an annular flange 139ᵃ rotatably engaging an annular groove 133ᵃ in the torsion head so that upon rotation of the nut 139 there is effected an endwise movement of the shank 132 which is splined to the torsion head 133, thereby regulating the tension of the ribbon 125. The notches 133ᵇ in the upper end of the torsion head 133 may be engaged by a spanner wrench or the like and the entire torsion head may be thus rotated, against the frictional resistance exerted by the clamping nut 138, to carry with it the ribbon 125 and thereby adjust the position of the mirror 32 so that the beam 31 received thereby will be properly directed along the line 36 to the mirror 37.

At its bottom end, the ribbon 125 is secured in a clamp 142 fixed on an insulating plate 143 which is provided with elongated slots engaged by screws 144 by which the plate is clamped to the side plate 118 of the galvanometer at a point slightly above the lower part of the magnet 116. By loosening the screws 136 and the screws 144, both of the insulating plates 135 and 143 may be adjusted simultaneously on their supports to cause the vertical portions of the coil 127 to occupy the proper positions within the air gaps 128.

One end portion of the wire which forms the winding of each galvanometer coil is extended loosely to an insulated terminal post 145 mounted on the flange 118ᶜ of the side plate 118, as shown in Fig. 6. The outer part of this terminal member is slotted for engagement by the bifurcated lower end of a metal clip 146 which extends upwardly and is secured by a terminal screw 147 to one end of the insulating connector block 134 where it is attached to one wire 35ᵃ of the supply cable 35 through which electrical oscillations to be studied and recorded are received. The other wire 35ᵇ of this electrical connection is soldered to a flange formed on the upper end of the metallic bushing 137, thus forming an electrical connection through the torsion head 133 and the shank 132 with the ribbon 125 to which the other end of the wire 130 is soldered or otherwise secured in the region of the coil 127. The metal bushing 137 fixed in the connector block 134 fits over the torsion head 133 and the entire block 134 and the parts carried thereby may be lifted out of engagement with the torsion head and the terminal post 145 to disconnect the supply conductors from the galvanometer.

The ribbon 125 is constructed as a comparatively narrow flat member occupying a plane which is parallel to or coincident with the plane of incidence of the beam coming to the mirror 32 so that the oscillation of the coil 127 sets up a torsional strain in the ribbon which tends to return it and the mirror to their normal positions. By adjusting the nuts 139 at the upper ends of the shanks 132, the tensions of the ribbons 125 of the various galvanometers may be regulated in order to adjust the sensitivity of the galvanometers to the oscillations in the electric current traveling through the coils 127. By adjusting the torsion head 133 of each galvanometer angularly on its supporting plate 135, the connected mirror 32 may be regulated in its position so that the beam 36 reflected therefrom will impinge upon the mirror 37 at the proper position laterally thereon.

In addition to the adjustments just mentioned, provision is made for adjusting the galvanometers bodily on their supporting brackets 115 about the center lines of the reflecting surfaces of their respective mirrors 32, thus causing a vertical adjustment of the positions of the beam 36 so that it will be reflected properly to the mirror 37. The means for effecting this angular adjustment of the galvanometers are shown particularly in Figs. 4, 6, 9, 15, 16 and 17. Mounted on the supporting brackets 115 at the front and rear sides of the galvanometers are a pair of supporting bars 150 which are secured to the brackets with rubber blocks 151 interposed between the brackets and their under sides to provide a somewhat resilient mounting for the galvanometers so that they will be less subject to external vibrations. These supporting bars 150 are provided with upwardly extending arcuate bearing surfaces 150ᵃ which are concentric with the center lines of the cylindrical mirrors 32 of the galvanometers, as illustrated particularly in Fig. 6. The side plates 118 and 119 of each galvanometer are provided on their front and rear edges with projections 118ᶠ and 119ᶠ, respectively, which have lower bearing surfaces concentric with the surfaces 150ᵃ, so that these projections may rest edgewise on the bars 150 and permit angular adjustment of the field structure of the galvanometer and all other parts thereof about the center line of the reflecting surface of the associated mirror 32. At each side of each galvanometer, an angle bracket 152 is secured to the pole piece 117 by a screw 153, the vertical flange of each bracket lying between two of the projections 118ᶠ and 119ᶠ and the top flange thereof lying flush with the upper surfaces of these projections. The top flange of each bracket is provided with an elongated slot 152ᵃ through which extends a threaded stud 154 secured in the underlying bar 150. The upper ends of these studs are engaged by clamping nuts 155 which are slotted for engagement by a wrench or screw driver so that they may be adjusted to clamp the galvanometer in position or release it so that it may be angularly adjusted in the manner described. In this way, the several galvanometers 33 may be independently adjusted on the supporting bars 150 in order to cause the beams 36 reflected therefrom to strike the mirror 37 in the proper locations.

In the recording system herein described, means are provided, as hereinafter described, for changing the speed of movement of the film or paper 40 and, in order that proper results may be obtained when operating at different speeds, apparatus has been provided in association with the galvanometers for cutting down the radiations admitted to the mirrors 32 when operating at low speeds and, in addition, means have been provided for automatically marking the sensitized film or sheet with equally spaced time lines appropriate for the speed at which the film is moving. The means for reducing the amount of invisible radiation admitted to and reflected from the galvanometer mirrors 32 when operating at a low speed includes a shutter 160 which normally occupies a horizontal position, as shown in Fig. 6, and which is adapted to be swung upwardly to the position shown by dotted lines in Fig. 17. This shutter is in the form of a thin flat plate having a plurality of square apertures 160ᵃ formed therein which are located so that, when the shutter is in its upright position, each of the apertures 160ᵃ will be located opposite one of the square apertures 118ᵉ in the galvanometer casing. The apertures 160ᵃ are substantially smaller than the apertures 118ᵉ so that, when the shutter is in its upright position, the invisible radiations passing to and reflected from each galvanometer mirror 32 are substantially reduced, which is desirable in order to prevent overexposure of the film when moving at a low rate of speed.

The shutter 160 is mounted on a small shaft 161 which has one end secured to a piston 162 mounted to travel in a cylinder 163 in which there is a coil spring 164 tending normally to move the shaft and its shutter toward the right, as viewed in Figs. 9, 10 and 17. The other end of the shaft 161 is secured to a plunger 165 which is slidably mounted in a sleeve 166 at the right end of the apparatus, as viewed in Figs. 9, 10 and 17. The sleeve 166 is provided with a helical slot 166ᵃ engaged by a pin 167 which is fixed on the plunger 165. The cylinder 163 and the sleeve 166 are secured in apertures in two supporting plates 168 which have their lower ends pivotally mounted on screws 169 engaging threaded apertures in the brackets 115 by which the galvanometers are supported. The plates 168 normally occupy the elevated positions shown in Figs. 4, 9 and 10, in which positions the rearward swinging of these members is limited by pins 170 fixed in the brackets 115. The members 168 are normally held in their upright positions by leaf springs 171 which are secured to the under sides of the brackets 115 with their free ends pressing against flat surfaces 168ᵃ formed on the lower ends of the members 168. When it is necessary to have access to the galvanometers from the front, the supporting plates 168 and the parts carried thereby may be swung downwardly and forwardly.

With the mounting of the shutter 160, it will be apparent that, upon pressing inwardly toward the left on the plunger 165, the inclined slot 166ᵃ, coacting with the pin 167, will rotate the shaft 161 and thus elevate the shutter to its upright position. This movement is brought about automatically at the time of changing the speed of operation of the recorder, by a shaft 172 which extends vertically at one side of the group of galvanometers and which has mounted thereon a rearwardly extending arm 173 positioned opposite the end of the plunger 165, as shown particularly in Fig. 17. This shaft 172 is provided near its lower end with a rearwardly projecting arm 174 which is pivotally connected to a shift rod 175, through the operation of which the change from a minutely rate of recording, for example, to an hourly rate, is effected, as hereinafter set forth. When the shift rod 175 is actuated to change to the slower rate of operation, the arm 173 on the shaft 172 is at the same time moved toward the left, as viewed in the drawings, to move the shutter 160 to its upper position and thereby restrict the galvanometer openings.

The plates 168, which are pivotally mounted on the brackets 115, also serve to support a concave cylindrical mirror 177 which is fixed on a shaft 178 journaled in the forward portions of the plates 168 in such positions that the mirror 177 occupies a position just below the lower margins of the galvanometer openings 118ᵉ and in front of the shutter 160 when the shutter is in its normal horizontal position, as shown in Figs. 6 and 17. The shaft 178 is provided at the end adjacent the shaft 172 with a crank arm 179 which is engaged by a leaf spring 180 attached to the adjacent supporting plate 168 and adapted to turn the mirror 177 to a position where it will direct a part of the rays received from the mirror 30 to the mirror 37. The crank arm 179 has a projecting part 179ᵃ which lies in the path of movement of the end portion 181ᵃ of a trip lever 181 of bell crank form which is pivoted by a pin 182 on a lower part of the shaft 172 so that the lever turns with the shaft. This trip lever has a horizontal arm 181ᵇ terminating in a downwardly extending finger 181ᶜ which is adapted to be actuated at the end of each minute when the apparatus is operating at a minutely rate and at the end of the hour when the apparatus is operating on an hourly rate. With each downward movement of the arm 181ᵇ the crank arm 179 is released by the extremity 181ᵃ of the lever which passes loosely through an aperture in the upper part of the shaft 172 and the crank arm 179 is thereby rotated by the spring 180 to cause the mirror 177 to reflect a part of the rays passing from the mirror 30 directly to the mirror 37, indepently of the galvanometer mirrors, so that an invisible radiation is thereby directed onto the surface of the film to form a horizontal time line.

Having described the galvanometers and the parts immediately associated therewith, further reference will now be made to the camera mechanism, including the previously mentioned magazines 45 and 46 which are located behind the guide plate 44 over which the film or paper 40 moves in the direction of the arrow 43, these features being particularly shown in Figs. 4, 6 and 11. The magazine 45 is in the form of a cylindical shell closed at its inner end by an end wall 45ª which has secured therein the inner end of the drum 46 upon which the supply of sensitized paper or film is wound. This drum 46 has a sliding fit on a tube 185 which is fixed at its inner end in the intermediate supporting plate 66 of the case 25. When the magazine has been fully inserted, the drum 46, which is closed at its outer end by a disk 46ª, extends beyond the outer end of the tube 185 but terminates short of the outer end of the cylindrical outer shell of the magazine. This end of the magazine extends into an opening 64ª formed in the side plate 64 of the case 25 and this end of the magazine is closed by a circular cover 186 which is recessed to give it a cup-shaped form and which has a handle portion 186ª extending across the recess. The cover 186 closely fits the outer end of the magazine and has a flange 186ᵇ which extends over the end of the magazine wall to form a light-proof closure. The cover 186 is recessed on its inner side as shown at 186ᶜ to receive the extremity of the drum 46 and the cover is normally secured in this position by a pair of latch members 187 which are located diametrically opposite to each other and which are pivotally mounted on pins 188 within recesses which are formed in opposite sides of the cover. The latch members have lugs 187ª which engage holes in the wall of the magazine when the cover is fully inserted and these lugs are pressed into engagement with these holes by leaf springs which are secured to the latch members, as shown in Figs. 11 and 11ª. The outer ends of the latch members are bent transversely as shown at 187ᵇ and by pressing inwardly upon these extensions of the latch members the cover may be released and then removed from the magazine by engaging the handle portion 186ª. With this construction, the supply of new film or paper may be put on the drum 46 when the magazine is removed from the recording apparatus, under conditions where the film will not be injured, and the cover 186 may then be applied to the magazine and the magazine may be inserted bodily in the recording apparatus through the aperture 64ª in the end wall thereof.

The cylindrical wall of the magazine 45 is provided with a longitudinal slot 45ᵇ, extending substantially throughout the distance between the end wall 45ª and the cover 186, through which the film 40 is withdrawn during the operation of the apparatus. A pair of flat metal bars 189 are secured to the magazine along the margins of the slot 45ᵇ and a sheet of velvet or the like is secured to the magazine under one of these bars and arranged normally to overlap the slot, thus excluding light during the withdrawal of the film. The end wall 64 of the case or housing 25 is provided with a notch 64ᵇ along the margin of the aperture 64ª to receive the bars 189 when the magazine is inserted. When the magazine has been pushed to its inner position on the tube 185, it is turned in a counterlockwise direction, as shown in Fig. 1, thereby moving one of the bars 189 to a position behind the end wall 64 so that the magazine is thereby held against accidental removal. The limit of this movement is determined by the transverse frame member 68 against which the left-hand bar 189 seats, as shown in Fig. 6. When the film in the magazine 45 has been completely withdrawn, the magazine may be rotated in a clockwise direction through the agency of the cover handle 186ª to bring the bars 189 again into registry with the notch 64ᵇ.

After emerging through the slot 45ᵇ in the upper magazine, the film passes over the upper horizontal portion of the guide plate 44 which is positioned beneath the mirror 37 and it then travels around the curved part of the guide plate and downwardly in front of the vertical portion thereof, the guide plate being secured in stationary position on the transverse frame members 68, 69 and 71. From the lower end of the guide plate 44, the film passes into the magazine 48 which contains the drum upon which the exposed film is wound. This magazine has an end wall 48ª secured to its cylindrical wall and having a hub member 190 secured to the central part thereof. Journaled in this hub member is a takeup shaft 191 having a squared extremity 191ª which fits a square recess in the block 192 secured in the outer end of the drum 49. This drum is provided at its inner end with a bearing ring 193 which is journaled on the hub member 190 carried by the end wall of the magazine. In this way, the takeup shaft is capable of being rotated, as hereinafter described to rotate the drum 49 with respect to the magazine 48 for the purpose of winding on the drum the exposed film or paper which is received from the feed roller 47. For the purpose of forming a connection with the end of the film, the drum 49 is provided with an inclined slot 49ª, shown in Fig. 6, engaged by the reversely bent end of the film or paper so that the film or paper is wound when the drum 49 is rotated in the direction of the arrow 194 through the actuation of the shaft 191, as hereinafter described.

The outer end of the drum 49 is journaled in a bearing ring 195 seated in a recess formed in the inner face of the cover 196 which is similar in construction to the cover 186 previously described, being recessed on its outer face and provided with a transverse handle portion 196ª through which it may be manipulated. This cover 196 is secured in place within the outer end of the drum 48 by latch members 197 which have lugs 197ª adapted to engage holes 48ᵇ formed in the drum on opposite sides thereof. The latch members 197 are pivoted on pins 198 located in recesses in opposite sides of the cover and leaf springs 199 are secured to these latch members and engage the inner walls of the recesses to force the lugs 197ª into engagement with the holes 48ᵇ. The transversely bent end portions 197ᵇ of the latch members may be engaged by the fingers of the operator to permit them to be pressed inwardly to release the cover. The construction and operation of the latch members 197 are the same as the construction and operation of the latch members 187. When the cover has been removed, the operator may place the end of the film into engagement with the slot 49ª in the drum, preferably in semi-darkness, and then, after the cover has been reinserted, the parts are in readiness for the winding of the film.

The drum 48 is provided on one side with a longitudinal bar 200, shown in Fig. 1, which is adapted to slide through a notch 64ᶜ formed in the end wall 64 at the margin of the hole 64ᵈ in the end wall which is engaged by the magazine when inserting it into the casing. After the magazine has been fully inserted, it is rotated slightly in a counterclockwise direction, thus bringing the bar 200 opposite the end wall 64 to retain the magazine in place. When the film has been rewound, a slight angular movement of the magazine through force applied to the handle 196ᵃ will restore the bar 200 to a position registering with the notch 64ᶜ so that the entire magazine may then be withdrawn with is cover attached, during which operation the drum 49 slides out over the takeup shaft 191 and the block 192 moves out of engagement with the square end of the shaft.

The film or paper 40 is held in contact with the feed roller 47 by an idler roller 201 which is rotatably mounted in a U-shaped roller frame 202 pivoted at 203 on brackets 204 carried by the base plate 60, as illustrated in Fig. 6. A pair of leaf springs 205 are secured to the base plate 60 and normally press the side arms of the roller frame 202 upwardly so that the idler roller 201 is held with resilient pressure against the film or paper and a close frictional engagement of the film or paper with the feed roller 47 is thereby obtained. The leaf springs 205 engage a transverse member 206 of the roller frame and the upward movement of this frame is limited by the contact of the member 206 with a bar 207 of Z-shaped cross section attached to the base plate 60. A guide plate 208 is mounted above the bar 207 and serves to guide the film or paper toward a slot 48ᶜ in the magazine.

From the feed roller 47, the film passes through the slot 48ᶜ in the magazine 48 and then engages the reversely inclined slot 49ᵃ in the drum 49. A curved knife blade 210 is mounted on the outside of the magazine 48 and has a slot 210ᵃ having a cutting edge along one margin thereof and adapted to register with the slot 48ᶜ. This knife blade is provided with arcuate slots which engage rivets 211 secured in the wall of the magazine and the knife blade is held against movement about the axis of rotation of the drum 49 by two stationary bars 212 which have their ends secured in the plates 64 and 66. Assuming that a desired record has been made and that the exposed part of the film or paper is to be removed while contained in the magazine, the magazine is first rotated to bring the bar 200 on its outer side into registry with the notch 64ᶜ, shown in Fig. 1. During this slight rotation of the magazine, the knife blade 210 is held stationary by the bars 212 so that the cutting edge of the blade severs the film and at the same time these bars move the blade to a position where it closes the slot 48ᶜ in the magazine, thereby protecting the exposed film or paper against the action of undesired radiations when the magazine is withdrawn from the case. In addition to the notch 64ᶜ, the end wall is suitably notched as shown at 64ᵉ to permit the endwise movement of the knife blade 210 through the end wall 64 when the magazine is removed.

As heretofore mentioned, the feed roller 47 and the drum 49 are driven from the electric motor 50 through connections which include the speed change mechanism 55. These driving connections are illustrated particularly in Figs. 4, 6, 7 and 8, where the motor 50 is illustrated as being carried by a plate 214 which in turn is fixed on a plate 215 attached to the base plate 60 of the case through the agency of studs 216 and rubber blocks 217. The shaft 50ᵃ of the motor, at the end thereof opposite the blower 97, is connected to the speed reducer 51 which is connected through a flexible coupling 52 with the driving shaft 218 which drives the gearing mechanism 55 and which operates at a very slow speed, for example, two revolutions per minute. The shaft 218 is journaled in bearings in the walls of the casing 219 which houses the gearing mechanism and it has helical gears 220 and 221 rotatably mounted thereon and spaced apart. These gears are provided on their opposed faces with clutch teeth 220ᵃ and 221ᵃ, respectively, which are adapted to be engaged by the teeth of a clutch member 223 which is splined on the shaft 218 between the helical gears. The helical gears 220 and 221 mesh with other helical gears 224 and 225, respectively, which are fixed on an intermediate shaft 226 having its bearings mounted in the walls of the casing 219. The helical gear 225 meshes with another helical gear 227 secured upon another intermediate shaft 228 having its bearings mounted in the opposite walls of the casing 219. The gear 227 meshes with a helical gear 229 rotatably mounted on the output shaft 230 which is also journaled in bearings carried by the walls of the casing 219. Another helical gear 231 of larger diameter than the gear 229 is also rotatably mounted upon the shaft 230 and these two gears have opposed clutch teeth 229ᵃ and 231ᵃ which are adapted to be engaged by the teeth of a clutch member 233 splined on the shaft 230 between these two gears.

The speed with which the output shaft 230 rotates may have four different values, depending upon the positions of the clutch members 223 and 233. The clutch member 223 is adapted to be shifted on the shaft 218 by a shifting arm 234 which is bifurcated at its lower end to engage the annular groove in the clutch member 223 and which is attached at its upper end to a hollow shaft 235 journaled at one end in the end wall of the casing 219 and at the other end in a fixed frame member 236 mounted within this casing. A crank arm 237 is secured on the end of the shaft 235 and may be held in neutral position or in either of its driving positions by a resiliently mounted pin 237ᵃ adapted to engage one of a series of depressions 238 formed in the end wall 64 of the case or housing, as shown in Fig. 1. The other clutch member 233 is similarly actuated by a shift member 239 which is bifurcated at its lower end to engage the annular groove in the member 233 and which is attached at its upper end to a shaft 240 journaled in the frame member 236 and having a telescoping engagement with the hollow shaft 235. A crank arm 241 is secured to the outer end of the shaft 240 and a resiliently mounted pin 241ᵃ carried by this crank arm is adapted to engage one of a series of depressions 242 formed in the end plate 64 of the case or housing for holding the clutch member 233 either in its neutral position or in either one of its driving positions.

The intermediate output shaft 230, which is thus capable of being driven at four different speeds, depending upon the positions of the clutch members 223 and 233, is extended through the top wall of the casing 219 and has fixed on the end thereof a spur gear 244. This gear meshes with an idler spur gear 245 journaled on a stud shaft 246 and arranged to mesh in turn with a spur gear 247 fixed on a shaft 248 and meshing with another spur gear 249 which is fixed on a shaft 250. The shaft 248 has fixed thereon within the casing 219 a worm 251 which meshes with a worm gear 252 rotatably mounted on the horizontal roller driving shaft 253 which is journaled in the frame member 236 and in the end wall of the casing 219 and fixed on the outer end thereof the previously described sprocket gear 56 by which the sprocket chain 57 is driven. The shaft 250 has fixed thereon within the casing 219 a worm 254 which meshes with a worm gear 255 which is also rotatably mounted on the shaft 253. The opposed faces of the worm gears 252 and 255 are provided with clutch teeth adapted to be engaged by the teeth of a clutch member 256 splined on the shaft 253 between the worm gears. This clutch member is adapted to be shifted into engagement with the clutch teeth of one or the other of the worm gears by a clutch shifting arm 257 having a bifurcated end engaging an annular groove in the clutch member and fixed on the previously mentioned shifting rod 175 which is slidably mounted in the walls of the casings 219 and 25. The worm 251 and worm wheel 252 transmit motion on a 1 to 1 ratio but the worm 254 and worm wheel 255 transmit motion on a 60 to 1 ratio. Thus, the shaft 153, when coupled to the worm 251, turns as many times in a minute as it does in an hour when it is coupled to the worm 255.

The sprocket gear 56 on the roller driving shaft 253 drives the sprocket gears 58 and 59 and thus drives the feed roller 47 and the takeup shaft 191 by which the drum 49 is rotated. The roller 47 is fixed on a shaft 258 journaled in the plate 66 and in a bearing member 259 secured to the base plate 60 and the sprocket gear 59 is secured on one end of this shaft. The sprocket gear 58 which drives the shaft 191 is mounted on a short shaft 260 journaled and secured against endwise displacement in a ball bearing unit 261. The short shaft 260 has attached thereto three helical spring fingers 262 which are attached at their inner ends to a fiber disk 263 arranged to bear against the outer face of a metal disk 264 secured to the end of the shaft 191. This disk 264 is mounted to revolve in the recess of a bearing member 265 secured in the intermediate plate 66 of the housing 25 and the disk is retained in position in its bearing by a retaining ring 266 which is secured to the face of the bearing member and overlaps the edge of the disk. The ball bearing unit 261 is mounted in a bracket 267 secured to the intermediate frame member 66 and the sprocket gear 58 is positioned in alignment with the sprocket gears 56 and 59 so that, when the shaft 253 is driven by the connection heretofore described, the shaft 191 is actuated to rotate the drum 49 and thereby wind up the exposed portion of the film 40. Since the last portion of this driving connection is effected by the frictional contact of the fiber disk 263 and the metal disk 264, it will be apparent that slippage may occur and that the drum 49 will always be driven at a sufficient speed to wind up the film thereon regardless of changes in the diameter of the roll as it is wound.

Figure 7:
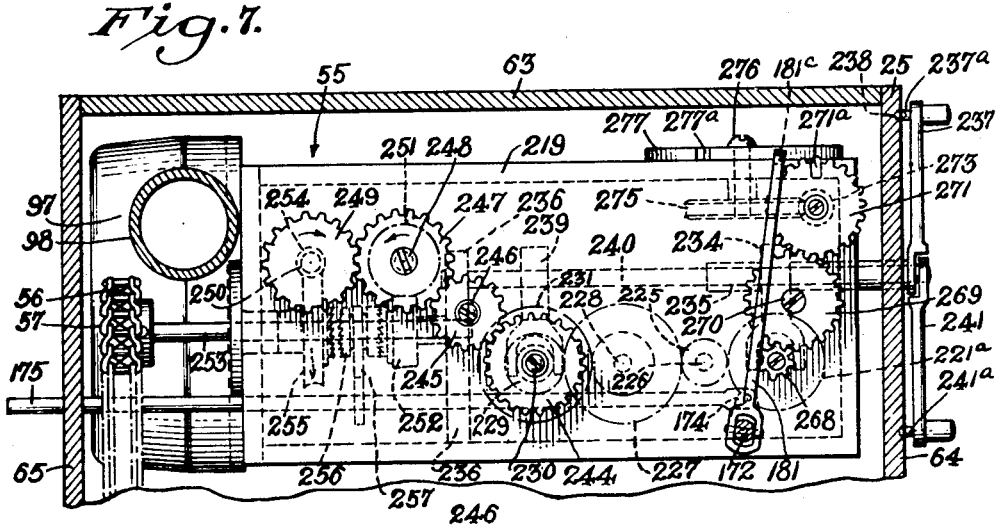
Fig. 7 shows a horizontal section taken on the line 7—7 of Fig. 4.
Figure 8:
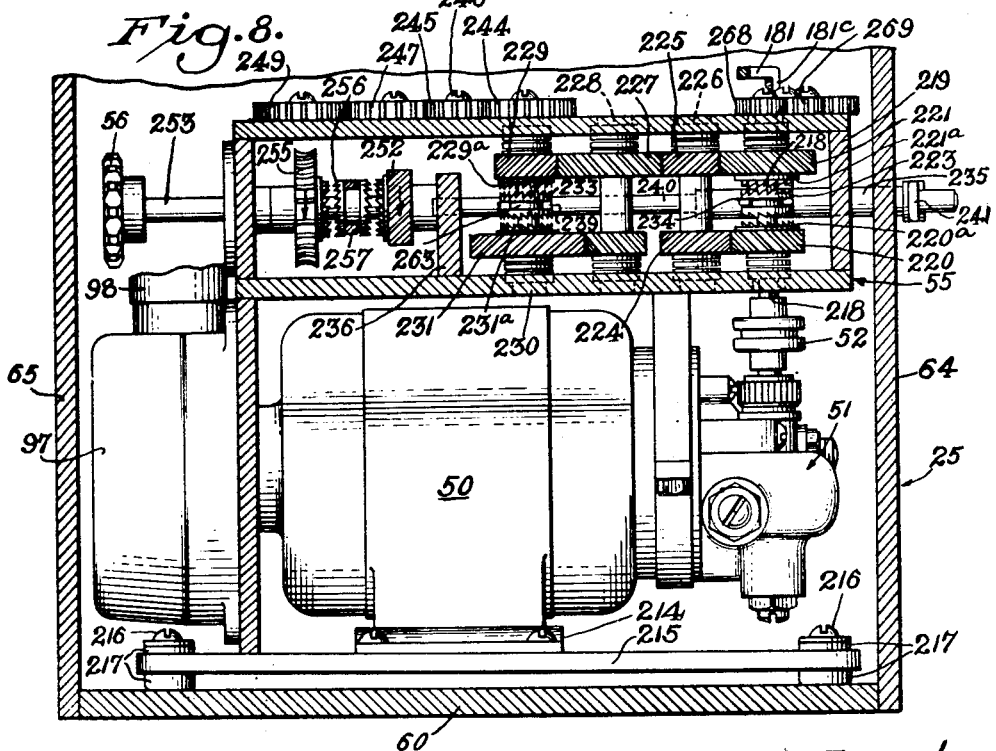
Fig. 8 shows a vertical section taken on the line 8—8 of Fig. 4.

As shown in Figs. 7 and 17, the shaft 218 which is driven at a low speed by the motor 50 also serves to drive the mechanism by which the lever 181 is periodically operated to form time lines on the film or paper 40 in the proper spaced relation, depending upon the speed at which the camera mechanism is operating. For this purpose, the shaft 218, which rotates with a speed of 2 R. P. M., has fixed thereon above the casing 219 a pinion 268 which meshes with a gear 269 mounted to revolve on a short shaft 270 secured in the upper wall of the casing 219. The pinion and gear are of such relative sizes that the gear 269 rotates with a speed of 1 R. P. M. and this speed is imparted by that gear to a gear 271 of the same size which is fixed on the upper end of a shaft 272 journaled in bearings carried by the upper and lower walls of the gear casing. A worm 273 is fixed on this shaft within the casing, as shown in Fig. 7. The worm 273 drives a worm wheel 275 secured on a horizontal shaft 276 which is journaled in bearings carried by the side wall of the gear casing and which has fixed on the outer end thereof a disk 277. The gear 271 has a depression 271ª on its upper side into which the rounded end 181ᶜ of the trip lever 181 is adapted to drop on each revolution of the gear when the apparatus is being operated on the minutely rate. When the shift rod 175 is operated to shift the clutch member 256 to change the speed from the minutely rate to the hourly rate, this shift rod operates at the same time to turn the shaft 172 in its bearings and thereby turn the arm 181ᵇ of the trip lever 181 from the position where it drops into the depression 271ª to a position where it drops into a depression 277ª formed in the margin of the disk 277 during each revolution of this disk, the gear ratio of the worm 273 and the worm wheel 275 being such that the gear 271 rotates 60 times as fast as the disk 277. In this way, the trip lever 181 is operated either by the gear 271, or by the disk 277, once during each revolution thereof, in order to actuate the mirror 177 through its crank arm 179 and thereby causing the invisible rays to form periodic, equally spaced and immediately visible time lines upon the sensitized film or paper 40. The operation of this time line mechanism results in the production of time lines every minute or every hour and is independent of the mechanism for changing the speed of movement of the paper or film.

The operation and advantages of the method and apparatus of the present invention will be apparent from the foregoing description, from which it appears that accurate, conveniently operated and efficient means have been provided for studying oscillations representative of various phenomena by making a permanent and immediately visible record through the agency of beams of invisible radiations which act as the "pen" to produce the trace on the sensitized paper, thus making the apparatus instantly and accurately responsive to various types of oscillations, including those of higher frequency, since it is unnecessary to overcome the inertia of any physical parts during the formation of the record. By using sensitizing emulsions which are responsive only to the invisible radiations which are used to trace and record the oscillations of the circuit or circuits under investigation and by employing an observation filter which excludes the invisible record-making radiations, it is possible to make a continuous permanent record for future study while permitting the observer to view the record progressively as it is produced. These relations are illustrated in their quantitative aspects in Fig. 18 of the drawing. In the upper row are two curves 280 and 281 showing by their ordinates the emissions of radiators in the ultra-violet and infra-red regions, respectively, in relative units which are percents of maximum emission. The abscissa of these curves are wave lengths measured in microns. The second set of curves show the spectral sensitivity of two types of emulsions, one curve 282 being for an emulsion which is sensitive to ultra-violet and blue and the other curve 283 being for an emulsion which is sensitive to the infra-red. The ordinates of these two curves are on a logarithmic scale and represent relative sensitivities, or reciprocal inertias, in relative units of ergs per square centimeter. The third set of curves 284 and 285 in the lower part of the diagram show the relative transmission characteristics of two types of filters. Contrary to the first two sets of curves for radiators and emulsions, which represent band-pass effects, the filter curves 284 and 285 are of the cutoff type, that is, the filter represented by the curve 284 cuts out the ultraviolet and some of the blue, while the filter represented by the curve 285 cuts out the infra-red and some of the red. This implies that the filter for the ultra-violet transmits all visible radiation from green to red, whereas the infrared filter transmits all of the blue, green, yellow and some of the red radiation. The ultra-violet and blue cutoff filter has a pale yellow coloring, while the infra-red cutoff filter is greenish in color. With filters of this kind it is therefore possible to observe and study in daylight the records being made by the recording apparatus.

A consideration of all three sets of curves of Fig. 18 together indicates the possibility and practicability of conforming to the requirements for the relations of the spectral actions of radiations, emulsions and filters hereinabove set forth. With an ultra-violet source as illustrated by these curves, the maximum emission corresponds well to the maximum sensitivity of an ultra-violet and blue sensitive emulsion. The spectral emission of an infra-red radiator, however, does not correspond quite as well to the spectral sensitivity of the emulsion. In the infra-red region, the curves for radiators, emulsions and filters are flatter and, therefore, indicate a lesser selectivity than that indicated by the corresponding curves for the ultra-violet region.

Although one form of the improved apparatus has been shown, by way of illustration, in connection with an explanation of one example of the improved method of the present invention, it will be understood that both the method and the apparatus may be modified in various ways without departing from the scope of the appended claims. The term "time-variations of electrical phenomena" as used in the claims to refer to phenomena which may be studied and recorded with the use of the present invention is to be construed broadly to include any phenomena which vary with time and is not limited to fluctuations which are continuous or regular in their manifestations. Also, the term "film" is to be construed as embracing any sensitized member capable of being used in the recording apparatus.

The term "trace" as used in the claims is intended to define a line having continuity, although variable in amplitude and direction, as distinguished from a spot.

I claim:

1. In recording apparatus for recording the time-variations of electrical phenomena, a source of invisible radiations, a film sensitive to said radiations, a plurality of devices each responsive to the time-variations in a separate one of a plurality of electric circuits, a plurality of mirrors each mounted on one of said devices to move therewith, another mirror for reflecting to each of said first-named mirrors invisible radiations coming from said source, and an additional mirror for reflecting to said film the invisible radiations reflected from each of said first-named mirrors, whereby said radiations act as invisible pointers for producing immediately visible records on said film.

2. In recording apparatus for recording the time-variations of electrical phenomena, a source of invisible radiations, a plurality of devices each responsive to the time-variations in a separate one of a plurality of electric circuits, a plurality of cylindrical mirrors each mounted on one of said devices to move therewith, another mirror for reflecting to each of said cylindrical mirrors invisible radiations received from said source, and means for adjusting each of said devices bodily about the center of the cylindrical mirror mounted thereon.

3. In apparatus for recording the time-variations of electrical phenomena, a source of invisible radiations, a film which is sensitive only to said invisible radiations, means for causing said radiations to move in unison with the movements of said phenomena and to be directed to the surface of said film, means for moving said film to cause a continuous record of said oscillations to be made on successive portions of said film, a housing for said apparatus, and a filter mounted in the wall of said housing and through which successive portions of said record may be viewed, said filter being formed to screen out the invisible portions of the spectrum.

4. In recording apparatus, a housing, a casing mounted in said housing, a source of radiations mounted in said casing, a mirror located below said casing, said casing having a slot through which said radiations pass to said mirror, a galvanometer mounted in said casing and having an oscillatory element carrying a second mirror adapted to receive radiations reflected from said first named mirror, a magazine for a supply of sensitized film, a guide member, means for withdrawing said film from said magazine and moving it over said guide member, a third mirror adapted to receive the radiations reflected from said second mirror and to reflect them to the portion of the film on said guide member, and a second magazine for storing the exposed film after it has passed over said guide member, a drum in said magazine, and means for rotating said drum to wind said film.

5. The combination in recording apparatus, of a housing having an aperture, a magazine inserted endwise through said aperture and comprising a drum to receive a winding of film, a cover engaging said aperture and fitting into the end of said magazine, and means for detachably securing said cover in said magazine.

6. The combination in recording apparatus, of a housing having an aperture, a magazine inserted endwise through said aperture and comprising a drum to receive a winding of film, and means rendered operative by a partial rotation of said drum after it has been inserted in said housing for preventing withdrawal of said drum from said housing.

7. The combination in recording apparatus, of a housing having an aperture, a magazine inserted endwise through said aperture and comprising a drum to receive a winding of film, said housing having a notch at its margin, and a stop member secured to the outer side of said magazine and adapted to pass through said notch when said magazine is inserted through said aperture into said housing, said stop member being adapted upon rotation of said magazine after it has been so inserted to pass out of registry with said notch to prevent removal of said magazine, and means carried by said housing and adapted to engage said stop member to limit said rotation of said magazine.

8. The combination in recording apparatus, of a housing having an aperture, a magazine inserted endwise through said aperture and comprising a drum to receive a winding of exposed film, means rendered operative by a partial rotation of said drum after it has been inserted in said housing for preventing withdrawal of said drum from said housing, said magazine having a film receiving slot, a member movably mounted on said magazine and adapted to close said slot, and means engaging said member when said magazine is so rotated to remove said member from its position closing said slot.

9. The combination in recording apparatus, of a housing having an aperture, a magazine inserted endwise through said aperture and comprising a drum to receive a winding of exposed film, means rendered operative by a partial rotation of said drum after it has been inserted in said housing for preventing withdrawal of said drum from said housing, said magazine having a film receiving slot, a member movably mounted on said magazine and adapted to close said slot, and means engaging said member when said magazine is so rotated to remove said member from its position closing said slot, said member having a knife edge and being adapted when said magazine is reversely rotated to permit removal of said magazine through said aperture and to cut off the film passing through said slot and to close said slot.

10. The combination in recording apparatus, of a housing having an aperture, a magazine engaging said aperture and removably mounted in said housing, said magazine having a slot, means for supporting a supply of sensitized film in said housing, means for withdrawing said film from said supply and moving it into said magazine, means located between said supply and said magazine for making a record on said film, a member adapted to be actuated to cut off said film at said magazine and to close said slot, and means for preventing the removal of said magazine from said housing until after said member has been so actuated.

11. The combination in recording apparatus, of a feed magazine containing a drum for supporting a winding of sensitized film, a takeup magazine containing a rotatable drum adapted to wind up the film, said magazines having slots, means for withdrawing said film from said first named drum and feeding it to said rotatable drum through said slots, means for making a record on said film between said magazines, and means including a friction driving clutch for rotating said rotatable drum to wind up the record bearing portion of said film as it is fed thereto.

12. The combination in recording apparatus, of a feed magazine containing a drum for supporting a winding of sensitized film, a takeup magazine containing a rotatable drum adapted to wind up the film, said magazines having slots, means including a feed roller for withdrawing said film from said feed magazine and moving it to said takeup magazine, means for making a record on said film as it passes from one magazine to the other, means for maintaining said film in contact with said feed roller, and means including a friction driving clutch for rotating said rotatable drum to wind the record bearing portion of said film as it is fed thereto.

13. In recording apparatus for recording the time-variations of electrical phenomena, a source of invisible radiations which transmits a maximum of energy at predetermined wave lengths, a recording medium carrying a photo-sensitive emulsion which is sensitive substantially only to the wave lengths of said radiations and undergoes an immediate change in response to said radiations to produce an immediately visible permanent trace, a galvanometer having a coil responsive to said time-variations, a mirror movable with said coil to reflect said radiations and cause them to move as a pointer in unison with the movements of said coil and to impinge upon said recording medium to produce a trace, and means for permitting the trace on said recording medium to be viewed in daylight as it is being formed.

14. In recording apparatus for recording the time-variations of electrical phenomena, a source of invisible radiations which transmits a maximum of energy at predetermined wave lengths, a recording medium carrying a photo-sensitive emulsion which is sensitive substantially only to the wave lengths of said radiations and undergoes an immediate change in response to said radiations to produce an immediately visible permanent trace, a galvanometer having a coil responsive to said time-variations, a mirror movable with said coil to reflect said radiations and cause them to move as a pointer in unison with the movements of said coil and to impinge upon said recording medium to produce a trace, and a filter for removing said invisible radiations from daylight and permit the inspection of said trace.

15. In recording apparatus for recording the time-variations of electrical phenomena, a source of invisible radiations which transmits a maximum of energy at predetermined wave lengths, a recording sheet photo-sensitized to be responsive to its maximum extent to the wave lengths of said radiations and to be altered by said radiations to produce an immediately visible permanent trace, means for moving said sheet at a predetermined speed, a galvanometer having a coil responsive to said time-variations, means including a mirror movable with said coil and acting to cause said radiations to move as a pointer in unison with the movements of said coil and to impinge upon said sheet to produce thereon an immediately visible and permanent record of said time-variations, and a filter for removing said invisible radiations from daylight to permit the inspection of said trace as it is being formed.

16. In recording apparatus for recording the time-variations of electrical phenomena, a source of invisible radiations which transmits a maximum of energy at predetermined wave length, a recording medium including a substance of maximum response to such wave length, said substance containing means which produce an immediately visible trace upon the incidence of such radiation, a galvanometer having a coil responsive to said time variations, and a mirror movable with said coil to reflect said radiations and cause them to move as a pointer with the movements of said coil and to impinge upon said recording medium to produce a trace.

17. In recording apparatus for recording the time-variations of electrical phenomena, a source of invisible radiations which transmits a maximum of energy at predetermined wave length, a recording sheet including a substance of maximum response to such wave length, said substance containing means which produce an immediately visible trace upon the incidence of such radiation, means for moving said sheet at a predetermined speed, a galvanometer having a coil responsive to said time variations, and a mirror movable with said coil to reflect said radiations and cause them to move as a pointer with the movements of said coil and to impinge upon said recording sheet to produce a trace.

CARL A. HEILAND.

REFERENCES CITED

The following references are of record in the file of this patent:

UNITED STATES PATENTS

| Number | Name | Date |
|---|---|---|
| 1,385,657 | Bell | July 26, 1921 |
| 1,451,842 | Pittman | Apr. 17, 1923 |
| 1,597,487 | St. Clair | Aug. 24, 1926 |
| 1,648,058 | Parker | Nov. 8, 1927 |
| 1,672,894 | Legg | June 12, 1928 |
| 1,686,204 | Covert | Oct. 2, 1928 |
| 1,713,226 | Hall | May 14, 1929 |
| 1,794,685 | Hayman | Mar. 3, 1931 |
| 1,824,469 | Dyche | Sept. 22, 1931 |
| 1,903,890 | Blum | Apr. 18, 1933 |
| 1,927,899 | Mylius et al. | Sept. 26, 1933 |
| 1,997,745 | Renker | Apr. 16, 1935 |
| 2,077,486 | Lootens | Apr. 20, 1937 |
| 2,170,435 | Sweeney | Aug. 22, 1939 |
| 2,170,857 | Elliott | Aug. 29, 1939 |
| 2,209,409 | Long | July 30, 1940 |
| 2,277,521 | McCarty | Mar. 24, 1942 |
| 2,304,901 | Eisler | Dec. 15, 1942 |
| 2,389,081 | Redmond | Nov. 13, 1945 |

FOREIGN PATENTS

| Number | Country | Date |
|---|---|---|
| 578,105 | France | June 23, 1924 |